(12) United States Patent
Kim et al.

(10) Patent No.: US 7,950,689 B2
(45) Date of Patent: May 31, 2011

(54) SEAT HAVING SIDE AIRBAG

(75) Inventors: Sang Ho Kim, Incheon (KR); Gi Hyung Nam, Anyang-si (KR); Chang Hwa Jang, Ulsan (KR); Jae Young Kim, Ulsan (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 430 days.

(21) Appl. No.: 11/965,461

(22) Filed: Dec. 27, 2007

(65) Prior Publication Data

US 2009/0026814 A1     Jan. 29, 2009

(30) Foreign Application Priority Data

Jul. 26, 2007  (KR) .................. 10-2007-0075313

(51) Int. Cl.
*B60R 21/207* (2006.01)
(52) U.S. Cl. .................... 280/730.2; 297/216.1
(58) Field of Classification Search ............... 280/730.2; 297/216.1
See application file for complete search history.

(56) References Cited

U.S. PATENT DOCUMENTS

| | | | | |
|---|---|---|---|---|
| 6,045,151 A * | 4/2000 | Wu | ............................ | 280/728.3 |
| 6,299,197 B1 * | 10/2001 | Mueller | ..................... | 280/728.3 |
| 6,612,610 B1 * | 9/2003 | Aoki et al. | ................. | 280/730.2 |
| 7,540,529 B2 * | 6/2009 | Tracht et al. | ............... | 280/730.2 |
| 7,677,594 B2 * | 3/2010 | Hazlewood et al. | ....... | 280/728.2 |
| 2006/0113766 A1 * | 6/2006 | Tracht et al. | ............... | 280/730.2 |
| 2007/0145727 A1 * | 6/2007 | Inoue et al. | ................ | 280/730.2 |
| 2007/0164545 A1 * | 7/2007 | Muller | ........................ | 280/730.2 |
| 2008/0018083 A1 * | 1/2008 | Ghisoni et al. | ............. | 280/730.2 |
| 2009/0001783 A1 * | 1/2009 | Hazlewood et al. | ....... | 297/216.1 |
| 2009/0008913 A1 * | 1/2009 | Breuninger et al. | ....... | 280/730.2 |
| 2009/0033081 A1 * | 2/2009 | Flischer et al. | ............ | 280/743.2 |
| 2010/0007122 A1 * | 1/2010 | Clauser et al. | ............. | 280/730.2 |
| 2010/0140905 A1 * | 6/2010 | Kim et al. | .................. | 280/730.2 |

FOREIGN PATENT DOCUMENTS

| | | |
|---|---|---|
| JP | 1996-258660 | 10/1996 |
| KR | 20-2000-0012184 U | 7/2007 |

* cited by examiner

*Primary Examiner* — Paul N Dickson
*Assistant Examiner* — Karen A Beck
(74) *Attorney, Agent, or Firm* — Morgan, Lewis & Bockius LLP

(57) ABSTRACT

A first exemplary seat with a side airbag disposed therein includes a front seat cover and a side seat cover. The seat covers are releasably attached together at a junction configured for the airbag to be deployed therethrough. The front seat cover is less stretchable than the side seat cover. A second exemplary seat with a side airbag disposed therein includes a front seat cover and a side seat cover. The seat covers are releasably attached together at a junction configured for the airbag to be deployed therethrough. The junction includes a first thread of the front seat cover, and a second thread of the second seat cover. The first thread is stronger than the second thread.

7 Claims, 3 Drawing Sheets

SEAT HAVING SIDE AIRBAG

CROSS-REFERENCE TO RELATED APPLICATIONS

This application claims priority to Korean Application No. 10-2007-0075313, filed on Jul. 26, 2007, the disclosure of which is incorporated herein by reference.

BACKGROUND OF THE INVENTION

1. Field of the Invention

The present invention relates to a seat having a side airbag.

2. Description of the Related Art

In a conventional seat with a side airbag, a side frame is provided on the sidewall of a seat frame. A side airbag unit is mounted to the side frame. A hard housing is provided behind the side airbag unit. The side airbag unit is covered with a reinforcing fabric, openable in the direction of deployment.

A soft cushion pad is used in the center part of the seat back for comfort, and a hard cushion pad is used in the side part of the seat back to support the occupant in the lateral direction when the vehicle turns. A partition wall thus must be provided in the mold for forming the cushion pads. Furthermore, two separate materials are used for the cushion pads, which is costly.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A first exemplary seat with a side airbag disposed therein includes a front seat cover and a side seat cover. The seat covers are releasably attached together at a junction configured for the airbag to be deployed therethrough. The front seat cover is less stretchable than the side seat cover.

The front seat cover may include an inner layer and an outer layer. The inner layer is less stretchable than the outer layer.

The inner layer may be attached at ends thereof to the outer layer, or may be attached along a substantial portion of its length to the outer layer.

A single cushion pad may be provided in the seat.

A second exemplary seat with a side airbag disposed therein includes a front seat cover and a side seat cover. The seat covers are releasably attached together at a junction configured for the airbag to be deployed therethrough. The junction includes a first thread of the front seat cover, and a second thread of the second seat cover. The first thread is stronger than the second thread.

The front seat cover may include an inner layer and an outer layer. The inner layer is less stretchable than the outer layer.

The first thread may include first attachment parts, and the second thread may include second attachment parts. Each first attachment part is knotted to one of the second attachment parts.

Figure 1:
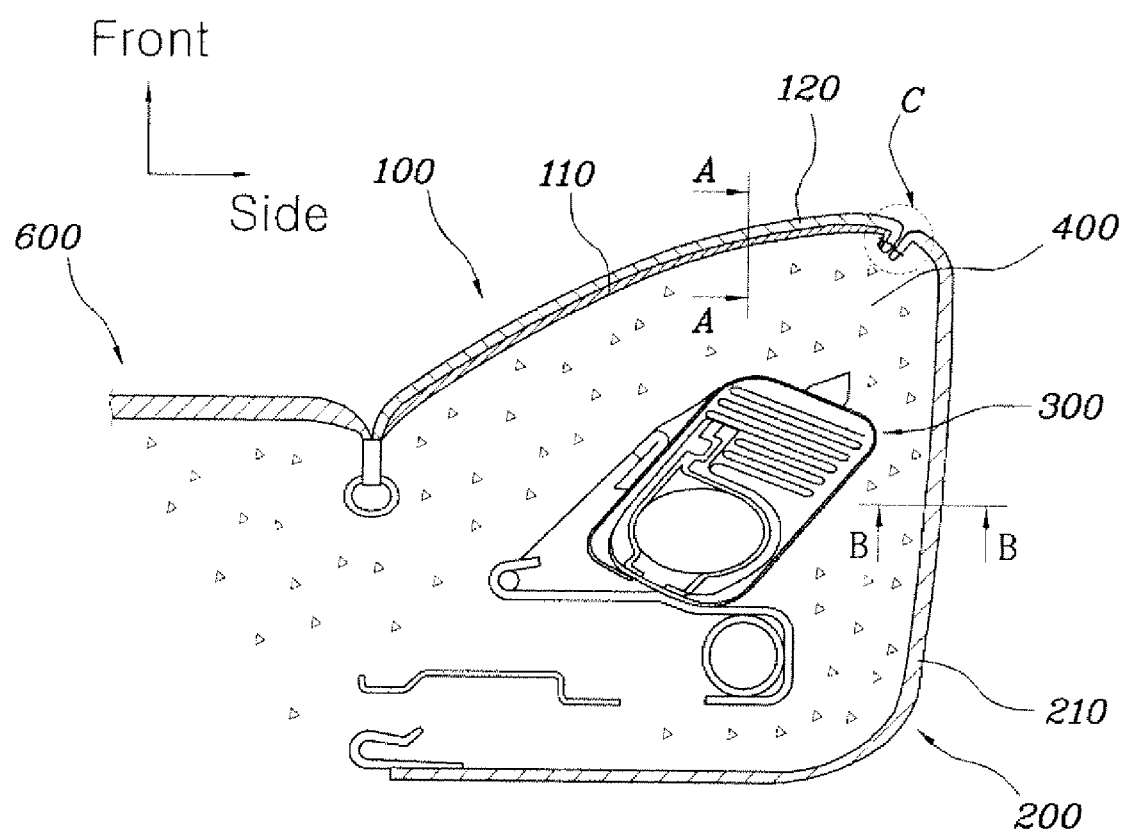
FIG. 1 is a cross-sectional view of a seat having a side airbag, according to an embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DESCRIPTION OF THE PREFERRED EMBODIMENTS

Reference will now be made in detail to a preferred embodiment of the present invention, an example of which is illustrated in the accompanying drawings and described below. While the invention will be described in conjunction with an exemplary embodiment, it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 2:
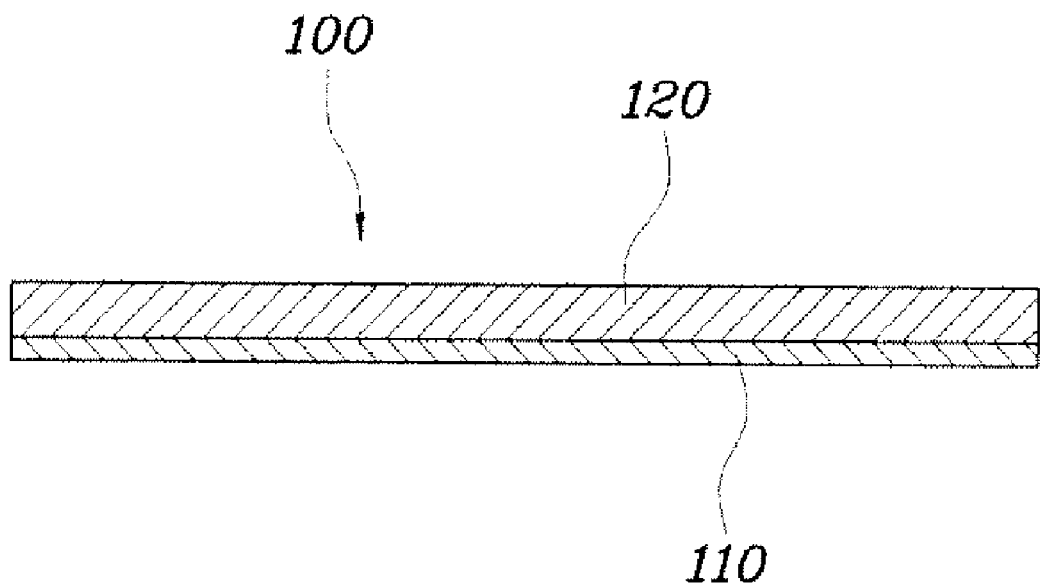
FIG. 2 is a sectional view taken along line A-A of FIG. 1.
Figure 3:
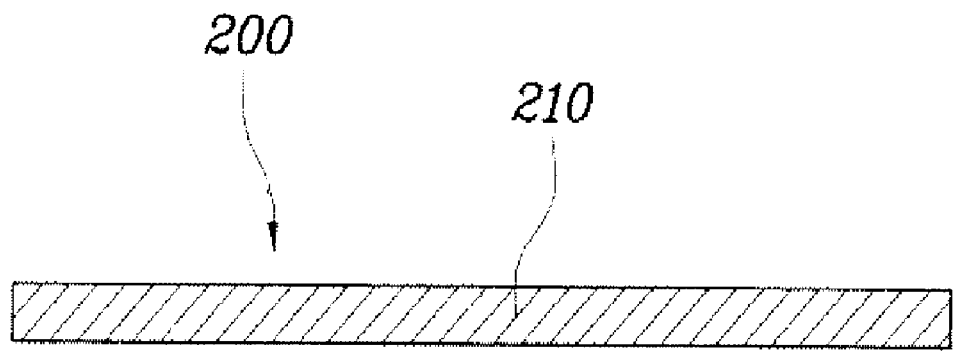
FIG. 3 is a sectional view taken along line B-B of FIG. 1.

As shown in FIGS. 1 through 3, embodiments of the present invention provide a seat having a side airbag. A front seat cover 100 and a side seat cover 200 cover the side part 500 of the vehicle seat back having a side airbag module 300 therein. A junction C between the front seat cover 100 and the side seat cover 200 defines a passage through which the side airbag is deployed. The side airbag can be deployed in the lateral direction, because the front seat cover 100 is made of material which is less stretchable than that of the side seat cover 200.

In detail, the front seat cover 100 includes an inner layer 110 and an outer layer 120. The inner layer 110 is made of relatively unstretchable material, compared to that of the outer layer 120. The side seat cover 200 has a single layer 210, which may be made of the same material as the outer layer 120 of the front seat cover 100. The inner layer 110 of the front seat cover 100 may be sewn at each end to the outer layer 120, or may be thermally welded to the outer layer 120.

When the side airbag is deployed, it pushes the side seat cover 200, which is more stretchable than the front seat cover 100, so that the side airbag is deployed in the lateral direction, thereby reliably cushioning the occupant.

A cushion pad 400 is provided in the side part 500, and may be made of material identical to that of a seat center part for supporting the back of the occupant. Since the inner layer 110 has high strength, a separate hard cushion pad is not necessary.

Figure 4:
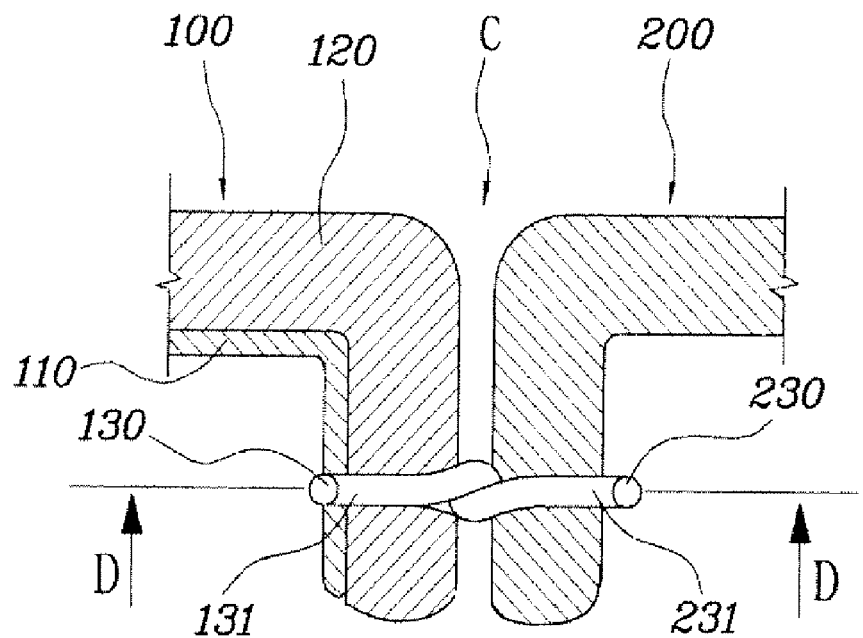
FIG. 4 is an enlarged sectional view showing part (C) of FIG. 1.
Figure 5:
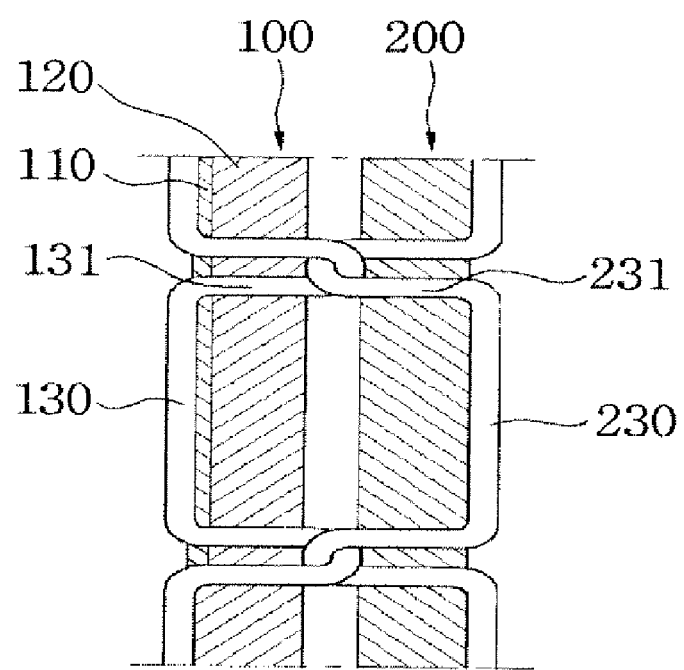
FIG. 5 is a sectional view taken along line D-D of FIG. 4.

Referring to FIGS. 4-5, a first thread 130 of the front seat cover 100 has first locking parts 131, spaced apart from each other at regular intervals into and out of the page in FIG. 4, and vertically in FIG. 5. A second thread 230 of the side seat cover 200 has second locking parts 231, also spaced apart from each other at regular intervals. Each first locking part 131 is knotted to a corresponding second locking part 230.

In some embodiments, the first thread 130 has a strength higher than that of the second thread 230. During deployment, the side airbag breaks the weaker second thread 230. Therefore, the side airbag is deployed in the lateral direction more easily.

In other embodiments, the difference in stretchability between the covers 100 and 200 provides the directionality of deployment, and the first thread 130 is not stronger than the second thread 230.

As described above, the present invention provides a seat having a side airbag which is deployed in the lateral direction, reliably protecting the occupant. The product is durable and cheap to manufacture.

Although preferred embodiments of the present invention have been disclosed for illustrative purposes, those skilled in the art will appreciate that various modifications, additions and substitutions are possible, without departing from the scope and spirit of the invention as defined in the accompanying claims.

What is claimed is:

1. A seat with a side airbag disposed therein, the seat comprising:
    a front seat cover; and
    a side seat cover;
    wherein the seat covers are releasably attached together at a junction configured for the airbag to be deployed therethrough;
    wherein the front seat cover is less stretchable than the side seat cover;
    wherein the front seat cover comprises an inner layer and an outer layer, wherein the inner layer is less stretchable than the outer layer; and
    wherein an airbag module is disposed in the seat and aligned toward a corner of the seat to deploy an airbag through the junction disposed at the corner of the seat.

2. The seat of claim 1, wherein the inner layer is attached at ends thereof to the outer layer.

3. The seat of claim 1, wherein the inner layer is attached along a substantial portion of its length to the outer layer.

4. The seat of claim 1, further comprising a single cushion pad in the seat.

5. The seat of claim 1, wherein the junction includes a first thread of the front seat cover and a second thread of the second seat cover, and wherein the first thread is stronger than the second thread.

6. The seat of claim 1, wherein the front seat cover comprises an inner layer and an outer layer, wherein the inner layer and the outer layer are attached to form a single body.

7. The seat of claim 5, wherein the first thread comprises first attachment parts and the second thread comprises second attachment parts, and wherein each first attachment part is knotted to one of the second attachment parts.

* * * * *